US012495188B2

United States Patent
Li et al.

(10) Patent No.: US 12,495,188 B2
(45) Date of Patent: Dec. 9, 2025

(54) METHOD, DEVICE AND MEDIUM FOR ENABLING MOVING COMMENTS TO A VIDEO

(71) Applicants: LEMON INC., Grand Cayman (KY); Beijing Zitiao Network Technology Co., Ltd., Beijing (CN)

(72) Inventors: Xiusong Li, Beijing (CN); Yuzhang Du, Beijing (CN); Zhilin Zhang, Beijing (CN); Didannuo Fei, Beijing (CN); Shaohua Song, Beijing (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 96 days.

(21) Appl. No.: 18/324,381

(22) Filed: May 26, 2023

(65) Prior Publication Data

US 2024/0267595 A1  Aug. 8, 2024

(30) Foreign Application Priority Data

Feb. 6, 2023  (CN) .......................... 202310125215.5

(51) Int. Cl.
*H04N 21/4788*  (2011.01)
*H04N 21/472*  (2011.01)

(52) U.S. Cl.
CPC ... *H04N 21/4788* (2013.01); *H04N 21/47217* (2013.01)

(58) Field of Classification Search
CPC ..................... H04N 21/4788; H04N 21/47217
See application file for complete search history.

(56) References Cited

U.S. PATENT DOCUMENTS

| 2016/0277328 A1* | 9/2016 | Ishizuka ............... H04L 51/226 |
| 2017/0195720 A1 | 7/2017 | Zuo |

(Continued)

FOREIGN PATENT DOCUMENTS

| CN | 105933758 A | 9/2016 |
| CN | 106973329 A | 7/2017 |

(Continued)

OTHER PUBLICATIONS

ISA China National Intellectual Property Administration, International Search Report Issued in Application No. PCT/CN2024/076342, May 13, 2024, WIPO, 3 pages.

(Continued)

*Primary Examiner* — Joshua D Taylor
(74) *Attorney, Agent, or Firm* — Alleman Hall & Tuttle LLP

(57) ABSTRACT

Method, device and medium for enabling moving comments to a video are provided in the present disclosure. The method comprises: obtaining a video from a server; displaying the video in a non-full screen mode and a moving comment post entry control on a screen of an electronic device, wherein the video does not overlap with a moving comment display area for displaying moving comments on the screen, wherein each of the moving comments is associated with a current playing progress of the video, and moves from one edge of the screen to an opposite edge of the screen; and displaying a moving comment input interface for inputting a moving comment on the screen, in response to a trigger operation on the moving comment post entry control.

19 Claims, 9 Drawing Sheets

(56) References Cited

U.S. PATENT DOCUMENTS

| | | | | |
|---|---|---|---|---|
| 2017/0330600 A1* | 11/2017 | Aliverti | ................ | H04N 5/91 |
| 2019/0082214 A1* | 3/2019 | Kim | ................ | H04N 21/8456 |
| 2019/0141402 A1* | 5/2019 | Cornell | ................ | G06F 3/0483 |
| 2022/0200945 A1* | 6/2022 | Summers | ................ | H04L 51/212 |
| 2023/0117037 A1* | 4/2023 | Lynne | ................ | G06F 3/0484 |
| | | | | 715/751 |
| 2023/0334594 A1* | 10/2023 | Fogu | ................ | G06Q 50/01 |
| 2024/0031675 A1* | 1/2024 | Tian | ................ | G06V 10/761 |
| 2024/0065671 A1* | 2/2024 | Matsumoto | ................ | A61B 8/0891 |

FOREIGN PATENT DOCUMENTS

| | | |
|---|---|---|
| CN | 108174278 A | 6/2018 |
| CN | 109218803 A | 1/2019 |
| CN | 111372140 A | 7/2020 |
| CN | 111432263 A | 7/2020 |
| CN | 113766336 A | 12/2021 |
| CN | 114125543 A | 3/2022 |
| CN | 114666648 A | 6/2022 |
| CN | 114679628 A | 6/2022 |
| WO | 2022024765 A1 | 2/2022 |

OTHER PUBLICATIONS

China National Intellectual Property Administration, Office Action and Search Report Issued in Application No. 202310125215.5, Mar. 19, 2025, 18 pages.

\* cited by examiner

METHOD, DEVICE AND MEDIUM FOR ENABLING MOVING COMMENTS TO A VIDEO

CROSS-REFERENCE TO RELATED APPLICATION

The present disclosure claims priority to P.R.C. patent application Ser. No. 202310125215.5, filed Feb. 6, 2023, and entitled "METHOD, DEVICE AND STORAGE MEDIUM FOR CONTROLLING VIDEO BULLETS", the entirety of which is incorporated herein by reference.

TECHNICAL FIELD

The present disclosure relates to a technical field of computer and network communication, and in particular to a method, device and medium for enabling moving comments to a video.

BACKGROUND

Moving comments displayed over a video can give users a real-time interactive feeling during watching videos, and enables users to discuss and communicate regarding the video content, and also see other users' views on the video, which increases users' sense of participation, atmosphere and identity. Therefore, moving comments have been recognized and loved by more and more users.

SUMMARY

The present disclosure provides a method, device and medium for enabling moving comments to a video.

Embodiments disclosed herein include a method for enabling moving comments to a video, comprising: obtaining the video from a server; displaying the video in a non-full screen mode and a moving comment post entry control on a screen of an electronic device, wherein the video does not overlap with a moving comment display area for displaying moving comments on the screen, wherein each of the moving comments is associated with a current playing progress of the video, and moves from one edge of the screen to an opposite edge of the screen; and displaying a moving comment input interface for inputting a moving comment on the screen, in response to a trigger operation on the moving comment post entry control.

Embodiments disclosed herein include an electronic device, comprising: a processor; and a memory with instructions stored thereon which, when executed by the processor, cause the processor to: obtain a video from a server; display the video in a non-full screen mode and a moving comment post entry control on a screen of the electronic device, wherein the video does not overlap with a moving comment display area for displaying moving comments on the screen, wherein each of the moving comments is associated with a current playing progress of the video, and moves from one edge of the screen to an opposite edge of the screen; and display a moving comment input interface for inputting a moving comment on the screen, in response to a trigger operation on the moving comment post entry control.

Embodiments disclosed herein include a non-transitory computer-readable storage medium having instructions stored thereon which, when executed by a processor, cause the processor to: obtain a video from a server; display the video in a non-full screen mode and a moving comment post entry control on a screen of an electronic device, wherein the video does not overlap with a moving comment display area for displaying moving comments on the screen, wherein each of the moving comments is associated with a current playing progress of the video, and moves from one edge of the screen to an opposite edge of the screen; and display a moving comment input interface for inputting a moving comment on the screen, in response to a trigger operation on the moving comment post entry control.

BRIEF DESCRIPTION OF THE DRAWINGS

Preferred embodiments of the present disclosure will be described below with reference to the accompanying drawings. The accompanying drawings, which are illustrated herein to provide a further understanding of the disclosure, are incorporated in and form a part of this specification together with the detailed description below, and serve to explain the disclosure. It should be understood that the drawings in the following description only refer to some embodiments of the present disclosure, and do not constitute limitations on the present disclosure. In the drawings.

DETAILED DESCRIPTION

The technical solutions in the embodiments of the present disclosure will be described clearly and completely with reference to the drawings in the embodiments of the present disclosure, but obviously, the described embodiments are only part of the embodiments of the present disclosure, not all of them. The following description of the embodiments is merely illustrative in nature, and in no way serves as any limitation on the disclosure and its application or use. It should be understood that the present disclosure may be embodied in various forms and should not be construed as limited to the embodiments set forth herein.

Traditional comments are not associated with playing progress of a video displayed on a screen of an electronic device and do not move on the screen. As described herein, the traditional comments are referred to as static comments, and moving comments refer to comments displayed in association with current playing progress of the video and moves across the screen of the electronic device.

If the moving comments are displayed over the video, they may block some content of the video and has a certain impact on viewing experience of viewers. The present disclosure describes embodiments which display moving comments in a blank area of the screen without blocking any content of the video. Therefore, viewers of the video can obtain a better viewing experience.

The present disclosure provides a method, a device and medium for enabling moving comments to a video. The method comprises: obtaining a video from a server; displaying the video in a non-full screen mode and a moving comment post entry control on a screen of an electronic device, wherein the video does not overlap with a moving comment display area for displaying moving comments on the screen, wherein each of the moving comments is associated with a current playing progress of the video, and moves from one edge of the screen to an opposite edge of the screen; and displaying a moving comment input interface for inputting a moving comment on the screen, in response to a trigger operation on the moving comment post entry control. The user interfaces controlled by the method, device and medium of some embodiments of the present disclosure are described below.

Figure 1A:
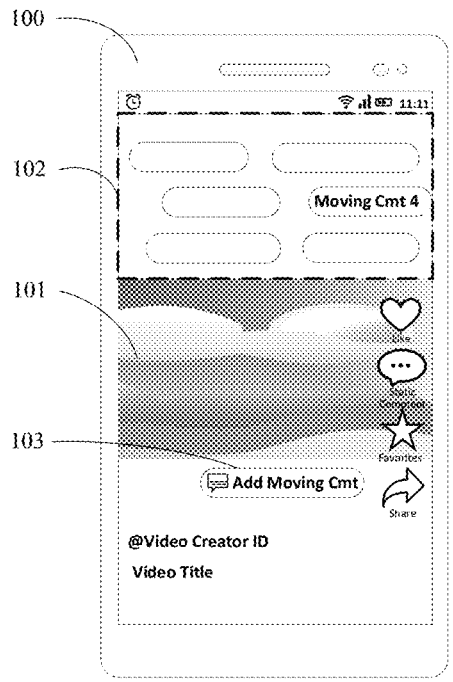
FIGS. 1A to 1D are illustrative diagrams of a video playing interface according to some embodiments of the present disclosure.

FIGS. 1A to 1D are illustrative diagrams of a video playing interface according to some embodiments of the present disclosure. As shown in FIG. 1A, a video 101 obtained from a server is displayed in a non-full screen mode on a screen of a terminal device 100. The terminal device 100 can be an electronic device capable of playing videos including, but not limited to, mobile phone, tablet computer, wearable device and the like.

The screen of the terminal device 100 has a moving comment display area 102 for displaying moving comments. The moving comment display area 102 does not overlap with the video 101. In the moving comment display area 102, moving comments (e.g., Moving Cmts 1 to 6 shown in FIG. 1A) may be displayed. Each of the moving comments may be associated with a current playing progress of the video 101. Since the moving comments do not block content of the video 101, a better video viewing experience can be obtained.

As shown in FIG. 1A, a moving comment post entry control 103 is displayed in the video playing interface. A moving comment input interface for inputting a moving comment may be displayed in response to a trigger operation on the moving comment post entry control 103. For unlogged-in users, a log-in process may be initiated before the moving comment input interface is displayed if the unlogged-in users trigger the moving comment post entry control 103. The moving comments and the moving comment post entry control 103 may be hidden if the video 101 is switched to full screen mode or if the video 101 is played on kid mode.

Figure 1B:
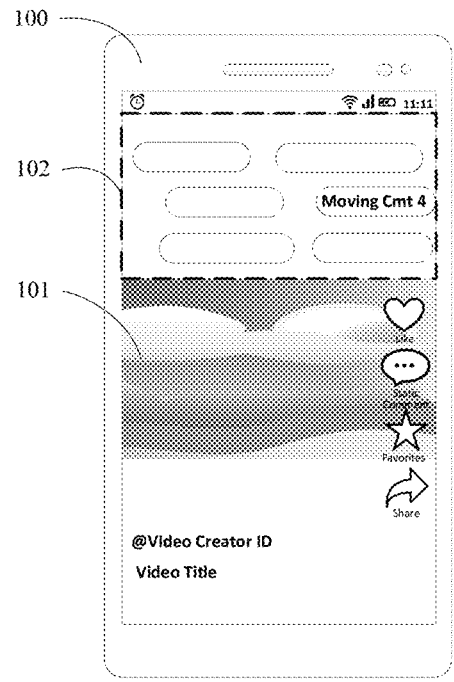
Figure 1C:
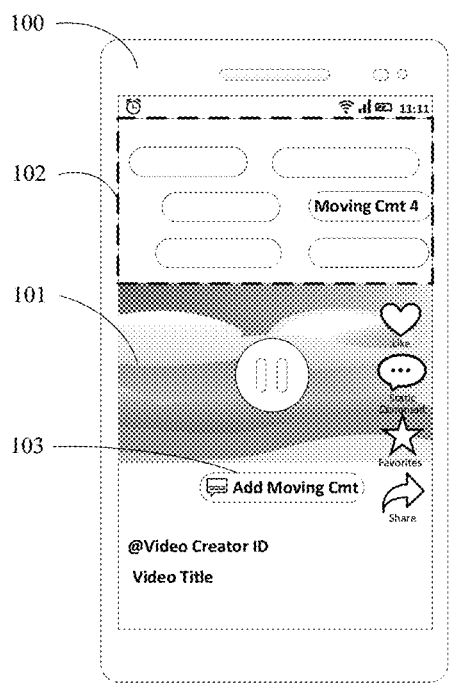

In some embodiments of the present disclosure, the moving comment post entry control 103 is hidden when the video 101 is playing as shown in FIG. 1B, and the moving comment post entry control 103 is displayed when the video 101 is paused as shown in FIG. 1C. Therefore, complexity of the video playing interface is reduced when the video 101 is playing. In addition, a moving comment is posted when the video is paused in this case. Therefore, the user has enough time to edit the moving comment, and the posted moving comment is matched with the current playing progress of the video 101. On contrast, if the user posts the moving comment while the video 101 is playing, actual posting time of the moving comment is delayed with respect to the playing progress of the video 101, which leads to mismatch between the posted moving comment and the playing progress of the video.

Figure 1D:
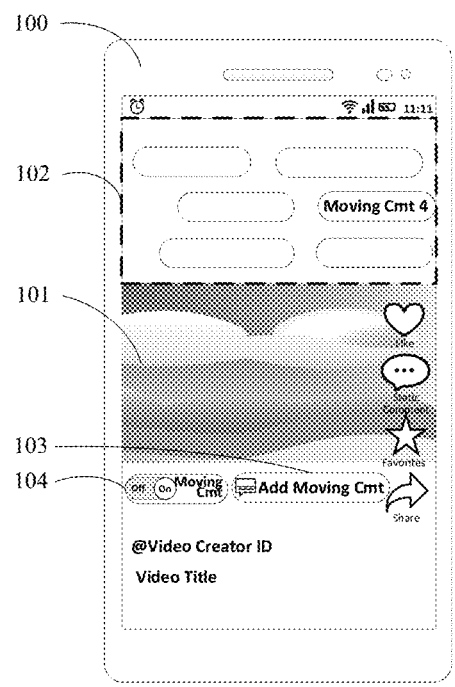

In some embodiments of the present disclosure, a switch control 104 for moving comment mode is displayed as shown in FIG. 1D. The switch control 104 may be displayed only when the video 101 is paused. Alternatively, the switch control 104 may be displayed both when the video 101 is paused and when the video 101 is playing. If the switch control 104 is turned on, the video 101 enters the moving comment mode, and the moving comments and the moving comment post entry control 103 are displayed. If the switch control 104 is turned off, the video 101 exits the moving comment mode, and the moving comments and the moving comment post entry control 103 are hidden.

The moving comments may move from one edge of the screen to an opposite edge of the screen. In some implementations, for example in a case where text direction of the moving comments is Left-to-Right, the moving comments start from the right edge of the screen, and move away on the left edge. In some implementations, for example in a case where the text direction is Right-to-Left, the moving direction of the moving comments is reversed, and the moving comments start from the left edge of the screen, and move away on the right edge. That is to say, the moving direction of the moving comments may be contrary to the text direction of the moving comments, such that a better reading experience on the moving comments can be obtained. A start time of a moving comment moving on the screen may be set as a time when a user who triggered the moving comment post entry control 103 to input the moving comment. The moving comments may be displayed with a certain interval (e.g., 16 pt) in several lines. All moving comments, regardless of their character lengths, may move across the screen for a same time length (e.g., 6 seconds).

The displayed moving comments may be selected from all moving comments posted by all viewers of the video 101 by ordering all the moving comments. For example, x seconds (e.g., x=30, can be changed by server) may be chosen as a time window. The moving comments within this time window may be ordered by their post time. First y moving comments (e.g., y=5, can be change by server) may be displayed, and any moving comments after y may not be displayed. The selected moving comments may be inserted into an empty line (e.g., space between the previous moving comment and right edge of the screen has been larger than a designed space). For a user who posts a moving comment, the moving comment may be displayed right away (using Optimistic UI) by inserting this moving comment to the queue. The moving comments may stop moving when the video 101 is paused. The moving speed of the moving comments may be scaled along with the playing speed of the video 101. For example, the moving speed of the moving comments may be doubled when the playing speed of the video 101 is doubled. The video 101 and the moving comments may be displayed as normal when moving a progress bar of the video 101, but may refresh and show moving comments in a corresponding time window when stopping moving the progress bar. The moving comments may not be displayed when the video 101 is downloaded.

In some embodiments of the present disclosure, the video 101 is a landscape video, and the screen of the electronic device 100 is in a portrait screen state as shown in FIG. 1. When the screen of the electronic device 100 is in a portrait screen state, the landscape video is usually displayed in a non-full screen mode. Therefore, displaying the moving comments in the moving comment display area 102 which does not overlap with the video 101 can efficiently utilize blank areas of the screen where the video 101 is not present. However, as can be understand by a person skilled in the art, the present disclosure can also be applied to embodiments where the video 101 is a portrait video and/or the screen of the electronic device is in a landscape screen state. In addition, although some embodiments of the present disclosure are described with respect to the video 101 displayed in non-full screen mode, some embodiments of the present disclosure can also be applied to a video displayed in full screen mode.

In some embodiments of the present disclosure, the moving comment display area 102 is provided above the video 101, and the moving comment post entry control 103 is provided below the video 101 as shown in FIG. 1A. Since the moving comment input interface called out by a trigger operation on the moving comment post entry control 103 may be usually displayed in a lower part of the screen of the terminal device 100, the moving comments displayed in the moving comment display area 102 above the video 101 will be less likely to be overlayed by the moving comment input interface. In addition, the moving comment post entry control 103 provided below the video 101 will not block the content of the video 101, and thus better video viewing experience can be obtained.

FIGS. 1A to 1D are described with moving comment function of the video 101 being enabled. However, in some cases, the moving comment function of the video 101 may be disabled, where the moving comments, the moving comment post entry control 103, and the switch control 104 for moving comment mode will not be displayed. For example, the moving comment function of the video 101 may be disabled manually by an author of the video 101. The moving comment function of the video 101 may be disabled automatically by an application executed on the electronic device or by a server, due to the video 101 does not meet certain conditions. The conditions may comprise at least one of: the video is a landscape video; or a time length of the video is larger than or equal to a certain time period (e.g., 10 seconds or any other time length). In addition, the moving comment function may be disabled if the video 101 is Ads video, LIVE, Photo, Now, Story, Moment, etc.

Figure 2A:
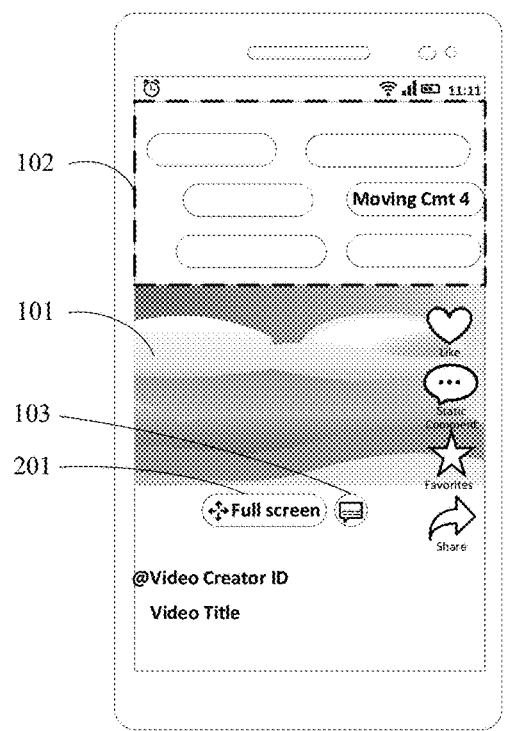
FIGS. 2A and 2B are illustrative diagrams of video playing interfaces with a full screen entry control according to some embodiments of the present disclosure.
Figure 2B:
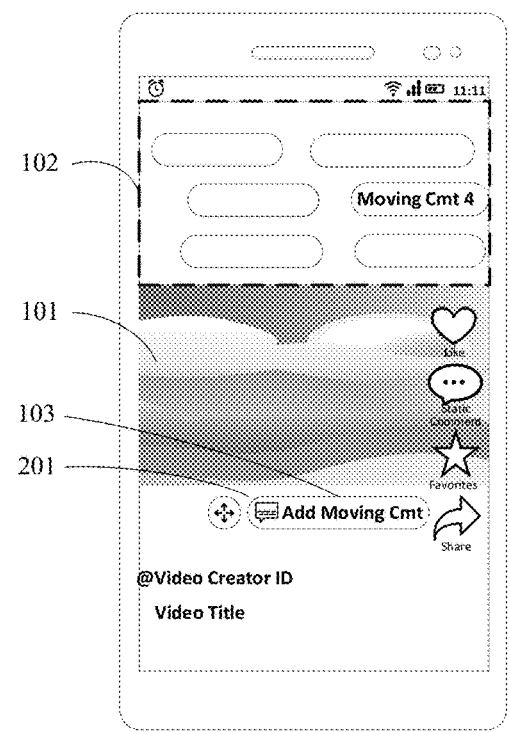

FIGS. 2A and 2B are illustrative diagrams of video playing interfaces with a full screen entry control 201 according to some embodiments of the present disclosure. As shown in FIGS. 2A and 2B, the full screen entry control 201 and the moving comment post entry control 103 is provided side by side. The full screen entry control 201 comprises a full screen icon and a full screen description, and the moving comment post entry control 103 comprises a moving comment post icon and a moving comment post description. To reduce an area occupied by the full screen entry control 201 and the moving comment post entry control 103, the full screen entry control 201 may be folded with the full screen icon being displayed and the full screen description being hidden, or the moving comment post entry control 103 may be folded with the moving comment post icon being displayed and the moving comment post description being hidden, or both of them may be folded.

In some embodiments of the present disclosure, the moving comment post entry control 103 may folded in response to a trigger operation on the moving comment post entry control or after the moving comment post entry control 103 is displayed for a certain period (e.g., 10 days). However, if the full screen entry control 201 is not displayed, the moving comment post entry control 103 may not be folded.

Figure 3A:
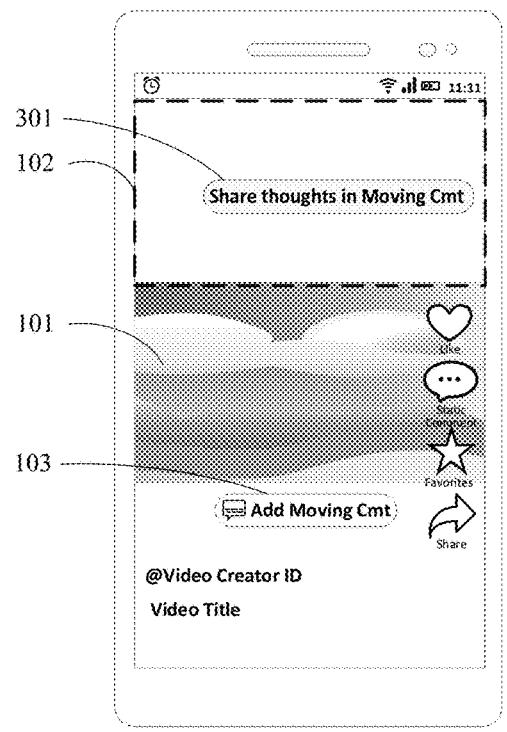
FIGS. 3A and 3B are illustrative diagrams of a video playing interface with a moving comment prompt message according to some embodiments of the present disclosure.
Figure 3B:
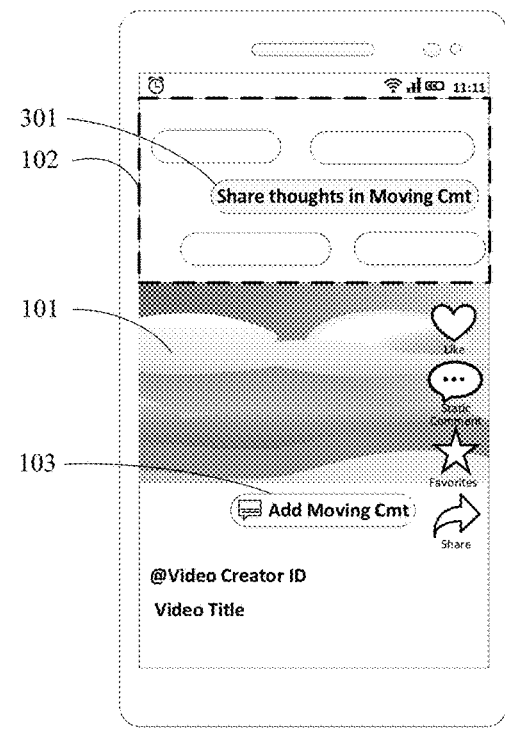

FIGS. 3A and 3B are illustrative diagrams of a video playing interface with a moving comment prompt message 301 according to some embodiments of the present disclosure. The moving comment prompt message can prompt a user to input a moving comment when watching the video 101. The moving comment prompt message 301 is displayed as a moving comment in the moving comment display area 102. As shown in FIG. 3A, the moving comment prompt message 301 is displayed without other moving comments. Alternatively, as shown in FIG. 3B, the moving comment prompt message 301 is displayed with other moving comments.

In some embodiments of the present disclosure, the moving comment prompt message 301 may be displayed after a user watches the video 101 for a certain period (e.g., 3 seconds). However, if the moving comment function of the video 101 is disabled, the moving comment prompt message 301 may not be displayed. The moving comment prompt message 301 may move across the screen for a same time length with other moving comments, and may be displayed for the user only once. In some embodiments of the present disclosure, a moving comment input interface may be displayed in response to a trigger operation on the moving comment prompt message 301. The moving comment prompt message 301 may keep moving after the trigger operation.

Figure 4A:
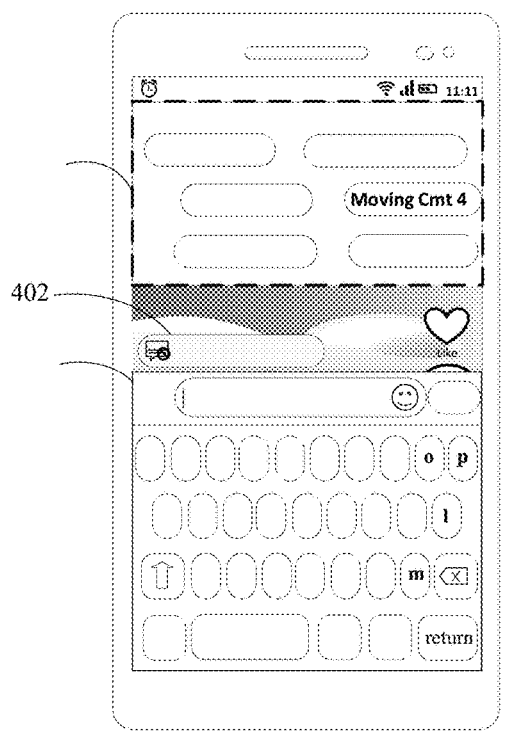
FIGS. 4A and 4B are illustrative diagrams of a video playing interface with a moving comment input interface according to some embodiments of the present disclosure.
Figure 4B:
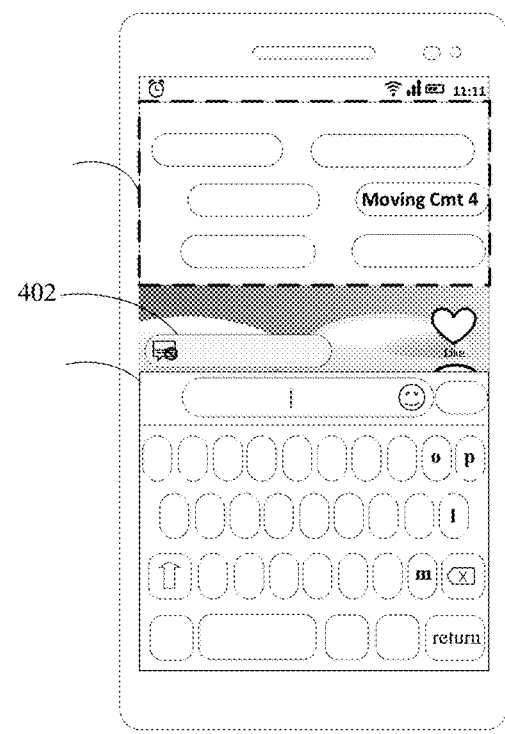

FIGS. 4A and 4B are illustrative diagrams of a video playing interface with a moving comment input interface 401 according to some embodiments of the present disclosure. In the moving comment input interface 401, a user can input a moving comment (e.g., "Love this song" as shown in FIG. 4B) and post it. The moving comment input interface 401 may include, but not limited to, a moving comment content input box, a keyboard, etc. After clicking the moving comment content input box, or inputting content in the moving comment content input box, a moving comment post control may be displayed in the moving comment input interface 401. The user may input the moving comment in the moving comment input interface 401 and trigger the moving comment post control to post the moving comment. Further, the moving comment posted by the user may be displayed in the moving comment display area 102, and the moving comment input interface 401 may be closed at the same time. The moving comment input interface 401 may be displayed with the video playing interface. For example, it may be a panel displayed on the video playing interface or a popup window displayed on the video playing interface. Alternatively, the video playing interface may be hidden when the moving comment input interface 401 is displayed.

The moving comment inputted by the user may comprise text, emoticon(s) or both of text and emoticon(s), and may be limited by a certain characters (e.g., 30 characters). The emoticon(s) may be sourced from an emoji database. The moving comment may undergo a Rethink process which verifies the content of the moving comment and prompts the user to re-edit the prompt if it is illegal.

Figure 4C:
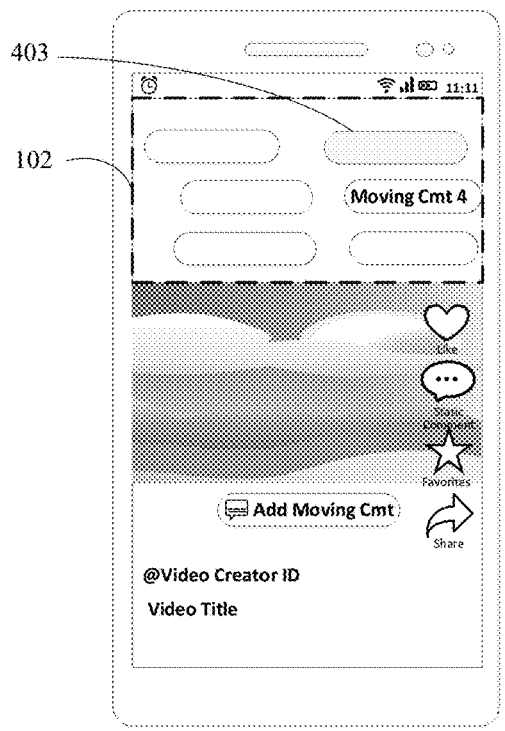
FIG. 4C is an illustrative diagram of a video playing interface with a moving comment posted by a user according to some embodiments of the present disclosure.

FIG. 4C is an illustrative diagram of a video playing interface with a moving comment 403 posted by a user according to some embodiments of the present disclosure. The moving comment 403 may be highlighted if it is the first prompt posted by the user. However, the moving comment 403 may not be highlighted when the user plays the video 101 next time. In addition, a post suspend message (e.g., "Too frequent. Please try again later.") may be displayed, if the user posts moving comments too frequently (e.g., the user posted two or more moving comments are within 3 seconds).

Returning back to FIGS. 4A and 4B, a moving comment off control 402 is displayed along with the moving comment input interface 401. The video exits the moving comment mode in response to a trigger operation on the moving comment off control 402, and moving comments and moving comment post entry control are hidden.

Figure 4D:
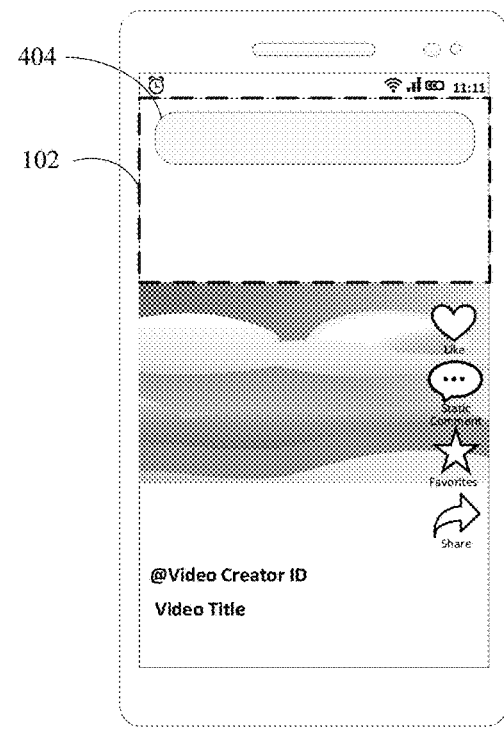
FIG. 4D is an illustrative diagram of a video playing interface which is not in moving comment mode according to some embodiments of the present disclosure.

FIG. 4D is an illustrative diagram of a video playing interface which is not in moving comment mode according to some embodiments of the present disclosure. A long press prompt message 404 may be displayed to prompt a user to display moving comments and moving comment post entry control by long pressing the video. If the user long presses the video, the video 101 enters the moving comment mode. In the moving comment mode, moving comments and moving comment post entry control are displayed.

Figure 5:
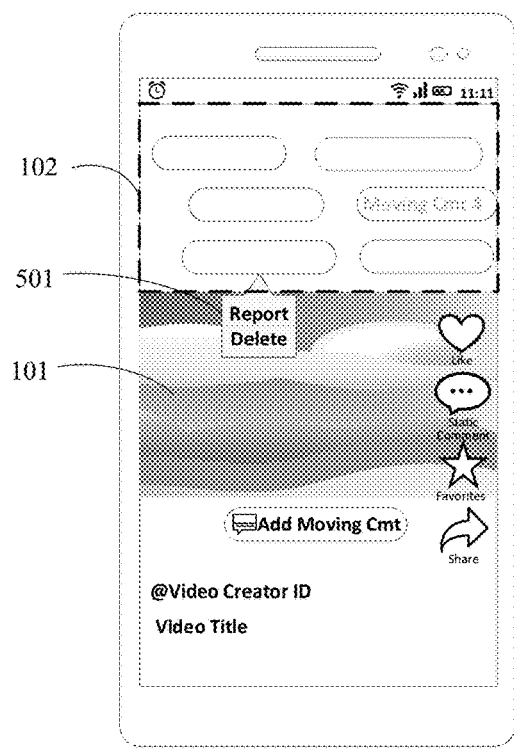
FIG. 5 is an illustrative diagram of a video playing interface with a moving comment being clicked according to some embodiments of the present disclosure.

FIG. 5 is an illustrative diagram of a video playing interface with a moving comment being clicked according to some embodiments of the present disclosure. A moving comment interactive interface 501 is displayed in response to a click operation on the moving comment (e.g., Moving comment 5 as shown in FIG. 5). The moving comment interactive interface 501 may comprise one or more interactive controls for the clicked moving comment. For a user who posted the moving comment, the moving comment interactive interface 501 may comprise a deleting control. For a creator of the moving comment, the moving comment interactive interface 501 may comprise a reporting control and a deleting control. For others, the moving comment interactive interface 501 may comprise a reporting control. A report sheet may be displayed in response to a trigger operation on the reporting control. In the report sheet, the moving comment may be reported to a supervisor. The moving comment may be deleted and removed from the video playing interface, in response to a trigger operation on the deleting control. A deleting prompt message (e.g. "This moving comment has been deleted") may be displayed after the moving comment is deleted.

In some implementations, the moving comment interactive interface 501 may comprise a moving comment off control (not shown). The video 101 exits the moving comment mode in response to a trigger operation on the moving comment off control. The moving comment interactive interface 501 may comprise other controls, such as a like control which can be used by the user to like the clicked moving comment.

In some implementations, the moving comment interactive interface 501 may include a moving comment hiding control (not shown). The clicked moving comment may be hidden in response to a trigger operation on the moving comment hiding control. Other moving comments may be normally displayed. Alternatively, moving comments similar to the clicked moving comment are also hidden, or all moving comments posted by a creator of the clicked moving comment are also hidden.

In some implementations, the video 101 exits the moving comment mode in response to a long-press operation or a double-click operation on any moving comment. In this case, the user can turn off the moving comment mode quickly and conveniently.

The clicked moving comment may stop moving, while the video play and other moving comments move as normal. The moving comment interactive interface 501 may close, and the clicked moving comment may start to move from where it stops if the user clicks the rest of the screen, or does not take any action within a certain period (e.g., 3 seconds). When the clicked moving comment stops moving, other moving comments may move through the clicked moving comment, and the clicked moving comment may be placed in the bottom layer with a visual overlap. If the user drags a progress bar or rewatch the video 101, the overlap disappears. The clicked moving comment may start to move from where it stops after an interactive operation on the interactive controls is completed.

Figures 6A, 6B:
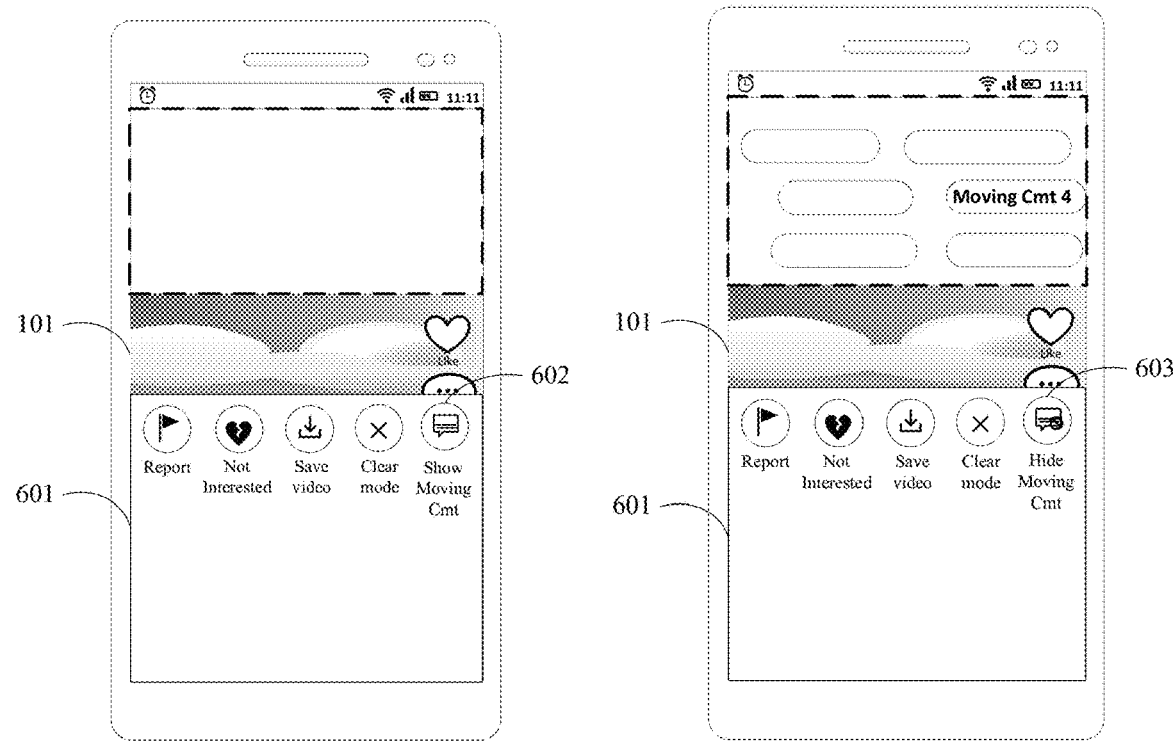
FIGS. 6A and 6B are illustrative diagrams of a video playing interface with a video interactive interface according to some embodiments of the present disclosure.

FIGS. 6A and 6B are illustrative diagrams of a video playing interface with a video interactive interface 601 according to some embodiments of the present disclosure. The video interactive interface 601 may be displayed in response to a long press operation on the video 101. As shown in FIG. 6A, a moving comment on control 602 is displayed in the video interactive interface 601 in a case where the video 101 is not in moving comment mode and moving comments and moving comment post entry control are hidden. As shown in FIG. 6B, a moving comment off control 603 is displayed in the video interactive interface 601 in a case where the video 101 is in moving comment mode and moving comments and moving comment post entry control are displayed.

In some embodiments of the present disclosure, a switch control for moving comment mode (not shown) is displayed in the video interactive interface 601 instead of the moving comment on control 602 and the moving comment off control 603. If the switch control is turned on, the video 101 enters the moving comment mode, and the moving comments and the moving comment post entry control 103 are displayed. If the switch control is turned off, the video 101 exits the moving comment mode, and the moving comments and the moving comment post entry control 103 are hidden. However, if the moving comment function of the video 101 is disabled, the switch control is turned off and becomes inactive where it cannot be turned on by the user.

In some embodiments of the present disclosure, a video creator may control if others can post moving comments to his/her video by enabling or disabling a moving comment function of the video. The moving comment function may be enabled or disabled at an account level or at a video level. If the moving comment function is disabled at the account level of a user, the moving comment function of all videos created by the user will be disabled, and cannot be enabled at the video level. If the moving comment function of a video is disabled by its creator, others cannot post moving comments to the video. In addition, moving comments and comments can be controlled together.

Figure 7A:
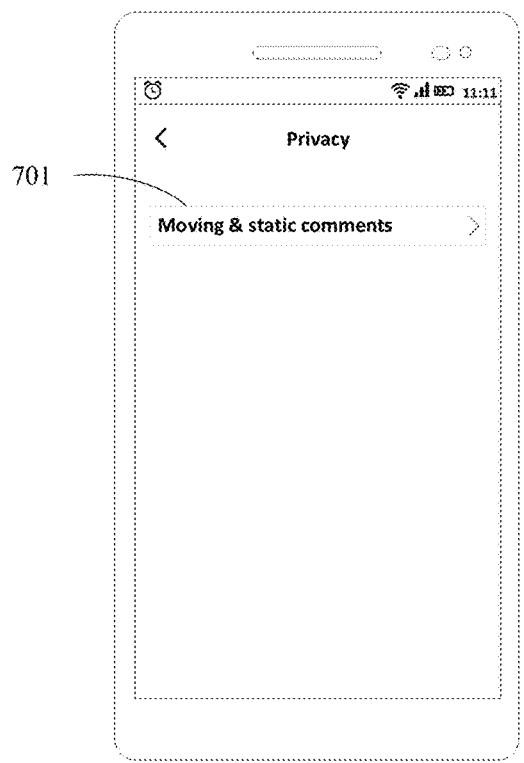
FIG. 7A is an illustrative diagram of a navigation page of an account privacy setting interface according to some embodiments of the present disclosure.
Figure 7B:
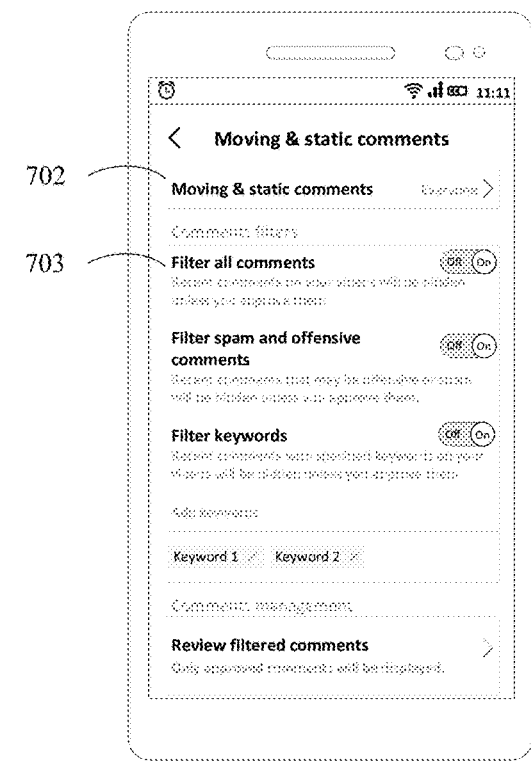
FIG. 7B is an illustrative diagram of a setting page for moving and static comments of the account privacy setting interface according to some embodiments of the present disclosure.

FIG. 7A is an illustrative diagram of a navigation page of an account privacy setting interface according to some embodiments of the present disclosure, and FIG. 7B is an illustrative diagram of a setting page for moving and static comments of the account privacy setting interface according to some embodiments of the present disclosure. As shown in FIG. 7A, the navigation page of the account privacy setting interface comprises a setting entry control 701 for moving and static comments. A setting page for moving and static comments of the account privacy setting interface may be displayed in response to a trigger operation of the setting entry control 701. As shown in FIG. 7B, the setting page for moving and static comments comprises a switch control 702 for moving and static comments, and filters 703 for filtering moving and static comments. The moving comment function and comment function can be enabled or disabled by turning on or off the switch control 702. If the moving comment function is disabled, a moving comment post entry control will be hidden when a video is played. If the switch control 702 is turned off, the moving comment function cannot be enabled via other controls.

Figure 8A:
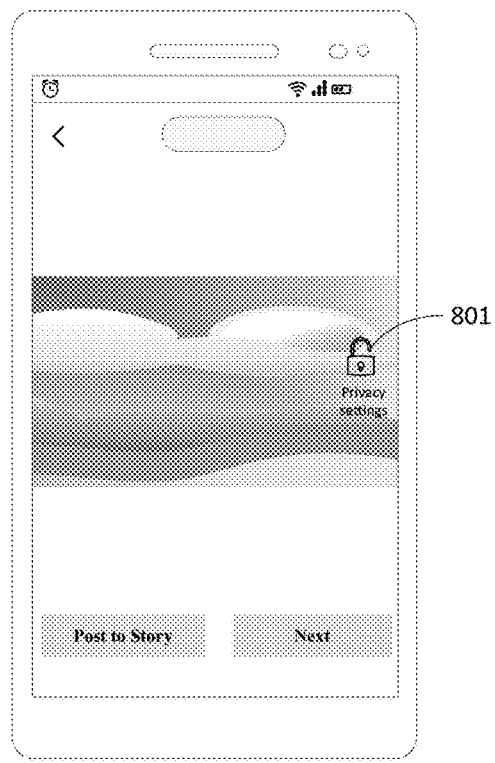
FIGS. 8A, 8B and 8C are illustrative diagrams of a video editing interface for a video to be posted according to some embodiments of the present disclosure.
Figure 8B:
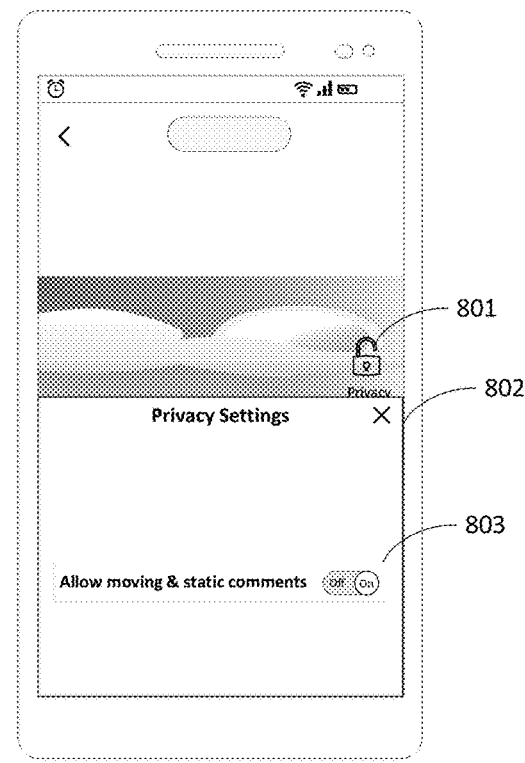
Figure 8C:
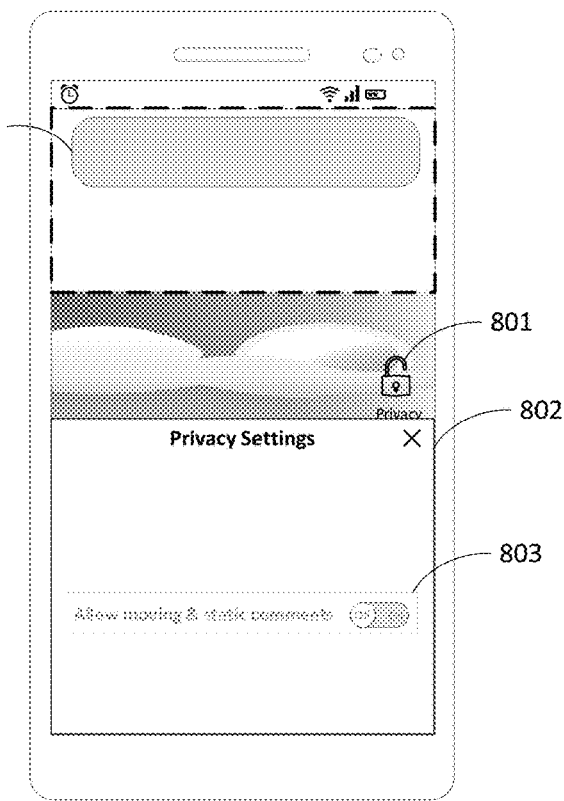

FIGS. 8A, 8B and 8C are illustrative diagrams of a video editing interface for a video to be posted according to some embodiments of the present disclosure. A video privacy setting interface 802 is displayed in response to a trigger operation on a privacy setting control 801 in the video editing interface. The video privacy setting interface 802 comprises a switch control 803 for moving and static comments. The switch control 803 can be turned on or off to enable or disable moving comment function and comment function of a video being edited, as shown in FIG. 8B. However, if the switch control 702 as shown in FIG. 7B is turned off, the switch control 803 is turned off and becomes inactive where it cannot be turned on as shown in FIG. 8C. A prompt message 804 may be displayed in response to a trigger operation of the switch control 803 in FIG. 9C, to prompt the user that the moving comment function cannot be turned on due to his/her account's privacy settings.

Figures 9A, 9B:
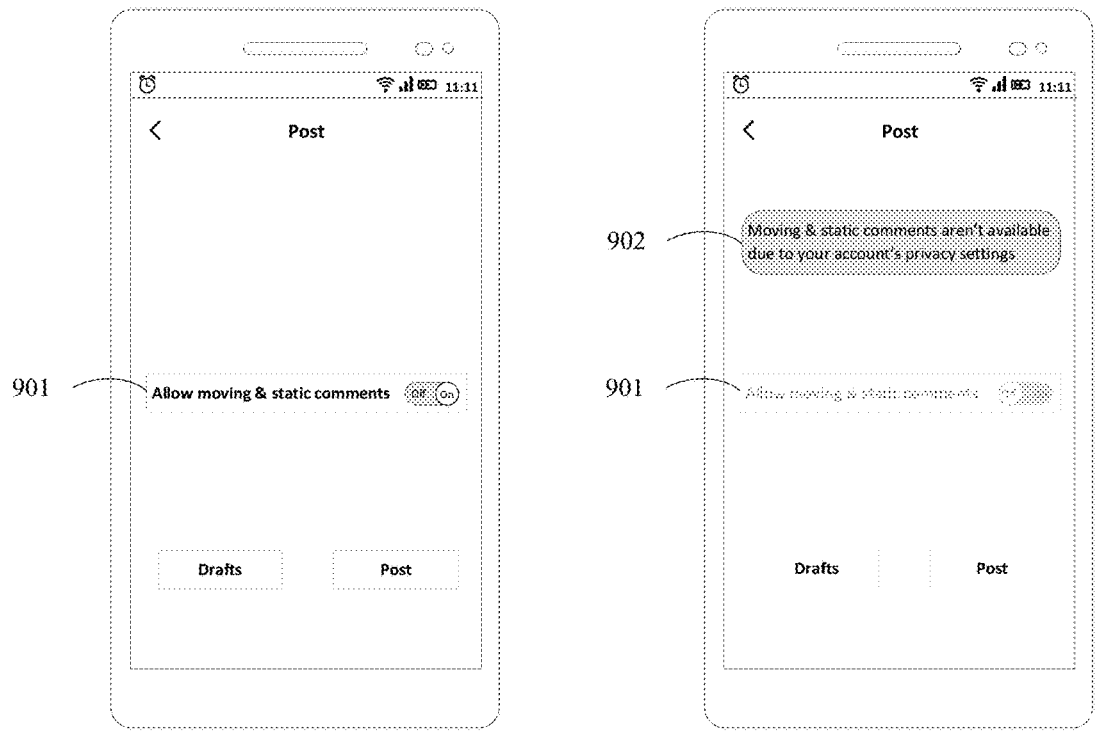
FIGS. 9A and 9B are illustrative diagrams of a video posting interface for a video to be posted according to some embodiments of the present disclosure.

FIGS. 9A and 9B are illustrative diagrams of a video posting interface for a video to be posted according to some embodiments of the present disclosure. The video posting interface comprises a switch control 901 for moving and static comments. The switch control 901 can be turned on or off to enable or disable moving comment function and comment function of the video to be posted, as shown in FIG. 9A. However, if the switch control 702 as shown in FIG. 7B is turned off, the switch control 901 is turned off and becomes inactive where it cannot be turned on as shown in FIG. 9B. A prompt message 902 may be displayed in response to a trigger operation of the switch control 901 in FIG. 9B, to prompt the user that the moving comment function cannot be turned on due to his/her account's privacy settings.

Figure 10A:
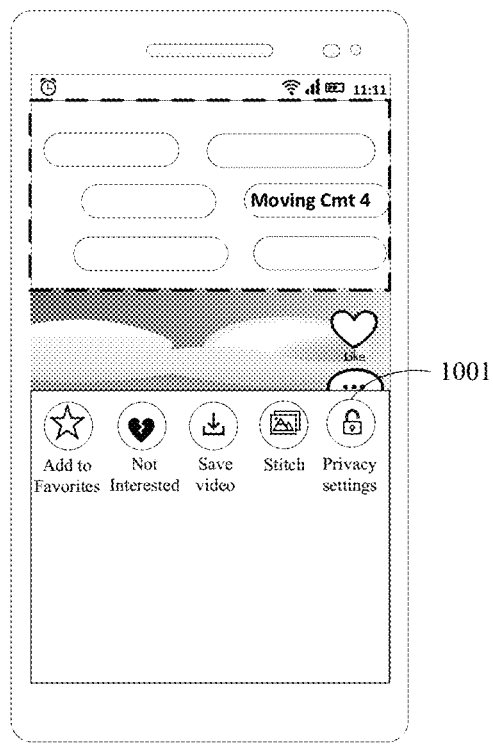
FIGS. 10A, 10B and 10C are illustrative diagrams of a video sharing interface for a posted video according to some embodiments of the present disclosure.
Figure 10B:
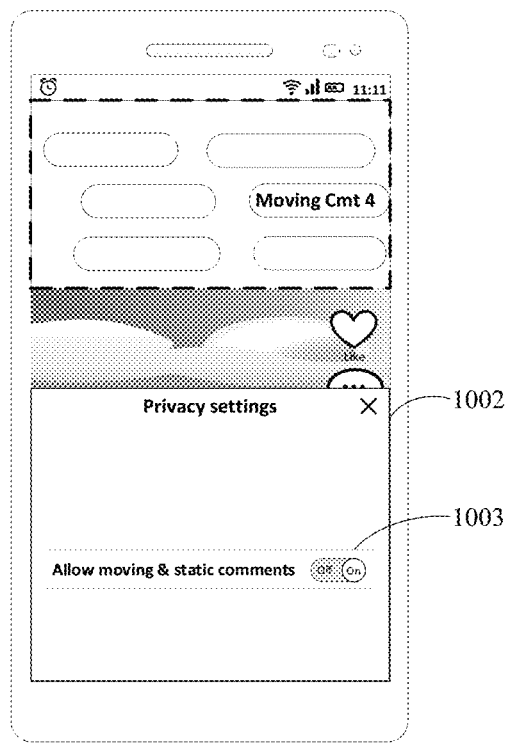
Figure 10C:
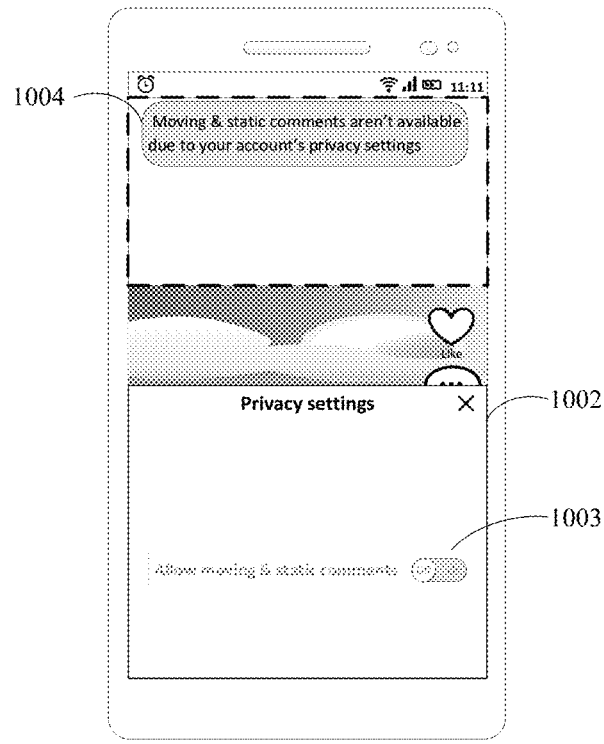

FIGS. 10A, 10B and 10C are illustrative diagrams of a video sharing interface for a posted video according to some embodiments of the present disclosure. A video privacy setting interface 1002 is displayed in response to a trigger operation on a privacy setting control 1001 in the video sharing interface. The video privacy setting interface 1002 comprises a switch control 1003 for moving and static comments. The switch control 1003 can be turned on or off to enable or disable moving comment function and comment function of the posted video, as shown in FIG. 10B. If the switch control 1003 is turned on, others can post moving comments and comments to the posted video. If the switch control 1003 is turned off, moving comments and comments that have already been posted and moving comment post entry control will be hidden. If the switch control 702 as shown in FIG. 7B is turned off, the switch control 1003 is turned off and becomes inactive where it cannot be turned on as shown in FIG. 10C. A prompt message 1004 may be displayed in response to a trigger operation of the switch control 1003 in FIG. 10C, to prompt the user that the moving comment function cannot be turned on due to his/her account's privacy settings.

Although it is shown in FIGS. 7 to 10 that moving comments and comments are controlled together, it can be understood by a person skilled in the art that moving comments and comments can be controlled separately in some embodiments of the present disclosure.

Figure 11:
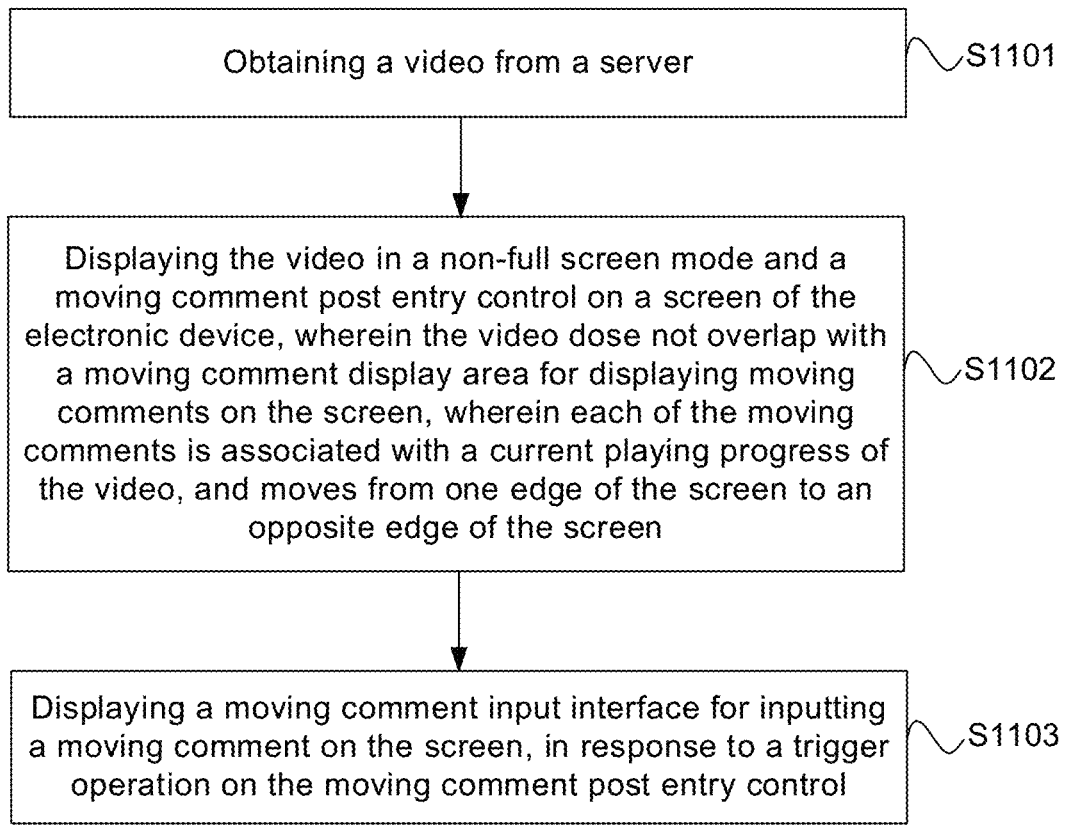
FIG. 11 is an illustrative flowchart of a method for enabling moving comments to a video according to some embodiments of the present disclosure.

FIG. 11 is an illustrative flowchart of a method for enabling moving comments to a video according to some embodiments of the present disclosure. The method may be implemented by an application executed by an electronic device in communication with a server. The application implementing the method may be a client running on the electronic device. At step S1101, the application obtains a video from a server. At step S1102, the application displays the video in a non-full screen mode and a moving comment post entry control on a screen of the electronic device. The video does not overlap with a moving comment display area for displaying moving comments on the screen. Each of the moving comments is associated with a current playing progress of the video, and moves from one edge of the screen to an opposite edge of the screen. At step S1103, the application displays a moving comment input interface for inputting a moving comment on the screen, in response to a trigger operation on the moving comment post entry control.

In some embodiments of the present disclosure, the video is a landscape video, and the screen of the electronic device is in a portrait screen state. However, as can be understand by a person skilled in the art, the present disclosure can also be applied to embodiments where the video 101 is a portrait video and/or the screen of the electronic device is in a landscape screen state.

In some embodiments of the present disclosure, the method further comprises determining whether the video meets a condition, the condition comprising at least one of: the video is a landscape video; or a time length of the video is larger than or equal to a first time period, wherein the moving comments and the moving comment post entry control are displayed in response to determining the video meets the condition.

In some embodiments of the present disclosure, the moving comment display area is provided above the video, and the moving comment post entry control is provided below the video.

In some embodiments of the present disclosure, the moving comment post entry control is displayed in response to a pause operation on the video. The method further comprises hiding the moving comment post entry control in response to a play operation on the video.

In some embodiments of the present disclosure, the method further comprises displaying a full screen entry control and the moving comment post entry control side by side. The full screen entry control comprises a full screen icon and a full screen description. The moving comment post entry control comprises a moving comment post icon and a moving comment post description. The full screen entry control is folded with the full screen icon being displayed and the full screen description being hidden, or the moving comment post entry control is folded with the moving comment post icon being displayed and the moving comment post description being hidden.

In some embodiments of the present disclosure, the moving comment post entry control is folded in response to a trigger operation on the moving comment post entry control or after the moving comment post entry control is displayed for a second time period.

In some embodiments of the present disclosure, the method further comprises displaying a moving comment prompt message as a moving comment in the moving comment display area. The moving comment prompt message is displayed with the moving comments, or the moving comment prompt message is displayed without the moving comments.

In some embodiments of the present disclosure, the moving comment prompt message is displayed after a user watches the video for a third time period.

In some embodiments of the present disclosure, the method further comprises displaying the moving comment input interface on the screen in response to a trigger operation on the moving comment prompt message.

In some embodiments of the present disclosure, the method further comprises displaying the moving comment inputted by the user in the moving comment input interface. The moving comment is highlighted if it is posted by the user at a first time.

In some embodiments of the present disclosure, the method further comprises displaying a moving comment off control along with the moving comment input interface on the screen, and hiding the moving comments and the moving comment post entry control in response to a trigger operation on the moving comment off control.

In some embodiments of the present disclosure, the method further comprises hiding the moving comments and the moving comment post entry control if the video is switched to a full screen mode.

In some embodiments of the present disclosure, the method further comprises displaying a moving comment interactive interface on the screen, in response to a click operation on a first moving comment of the moving comments in the moving comment display area. The moving comment interactive interface comprises an interactive control on the first moving comment.

In some embodiments of the present disclosure, the method further comprises hiding the moving comments and the moving comment post entry control in response to a long press operation or a double click operation on any of the moving comments.

In some embodiments of the present disclosure, the method further comprises displaying a video interactive interface on the screen in response to a long press operation on the video, wherein a moving comment off control is displayed in the video interactive interface if a moving comment function is enabled, and a moving comment on control is displayed in the video interactive interface if the moving comment function is disabled.

In some embodiments of the present disclosure, the method further comprises displaying an account privacy setting interface comprising a switch control to enable or disable a moving comment function of videos created by the user on the screen, wherein the moving comment function cannot be enabled via other controls if the switch control is turned off.

In some embodiments of the present disclosure, the method further comprises displaying at least one of a video editing interface or a video posting interface for a second video to be posted by the user on the screen, the at least one of the video editing interface or the video posting interface comprising a switch control to enable or disable a moving comment function of the second video.

In some embodiments of the present disclosure, the method further comprises displaying a video sharing interface for a third video that has been posted by the user on the screen, the video sharing interface comprising a switch control to enable or disable a moving comment function of the third video.

Details related to the method of the present disclosure have been described with reference to FIGS. 1 to 10, and will not be repeated here.

Figure 12:
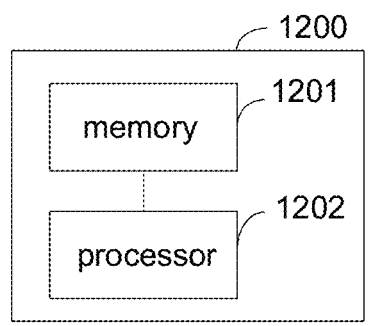
FIG. 12 is a block diagram illustrating an electronic device according to some embodiments of the present disclosure.

FIG. 12 is a block diagram illustrating an electronic device 1200 according to some embodiments of the present disclosure. For example, in some embodiments, the electronic device 1200 may be various types of devices, including but not limited to mobile terminals such as mobile phones, notebook computers, digital broadcast receivers, PDA (Personal Digital Assistant), PAD (Tablet PC), PMP (Portable Multimedia Player), vehicle-mounted terminals (such as vehicle-mounted navigation terminals), and fixed terminals such as digital TV, desktop computers, and the like. For example, the electronic device 1200 may include a display panel for displaying data and/or execution results utilized in the scheme according to the present disclosure. For example, the display panel may have various shapes, such as a rectangular panel, an oval panel, a polygonal panel, and the like. In addition, the display panel can be not only a flat panel, but also a curved panel or even a spherical panel.

As shown in FIG. 12, the electronic device 1200 of this embodiment includes a memory 1201 and a processor 1202 coupled to the memory 1201. It should be noted that the components of the electronic device 1200 shown in FIG. 12 are only exemplary, not restrictive, and the electronic device 1200 may also have other components according to practical application requirements. The processor 1202 may control other components in the electronic device 1200 to perform expected functions.

In some embodiments, the memory 1201 is used to store one or more computer readable instructions. When the processor 1202 is used to execute computer readable instructions, the computer readable instructions are executed by the processor 1202 to implement the method according to any of the above embodiments. For the specific implementation of each step of the method and related explanations, please refer to the above embodiments, and the repetition is not repeated here.

For example, the processor 1202 and the memory 1201 can communicate with each other directly or indirectly. For example, the processor 1202 and the memory 1201 may communicate over a network. The network may include a wireless network, a wired network, and/or any combination of wireless and wired networks. The processor 1202 and the memory 1201 can also communicate with each other through the system bus, which is not limited by the present disclosure.

For example, the processor 1202 can be embodied as various suitable processors and processing devices, such as a central processing unit (CPU), a Graphics Processing Unit (GPU), a network processor (NP), etc. It can also be a digital signal processor (DSP), an application specific integrated circuit (ASIC), a field programmable gate array (FPGA) or other programmable logic devices, discrete gate or transistor logic devices, and discrete hardware components. A central processing unit (CPU) can be X86 or ARM architecture. For example, the memory 1201 may include any combination of various forms of computer-readable storage media, such as volatile memory and/or nonvolatile memory. For example, the memory may include, but is not limited to, random access memory (RAM), dynamic random access memory (DRAM), static random access memory (SRAM), read only memory (ROM), and flash memory. The memory 1201 may 1201 may include, for example, a system memory which stores, for example, an operating system, an application program, a Boot Loader, a database, and other programs. Various applications and various data can also be stored in the storage medium.

Figure 13:
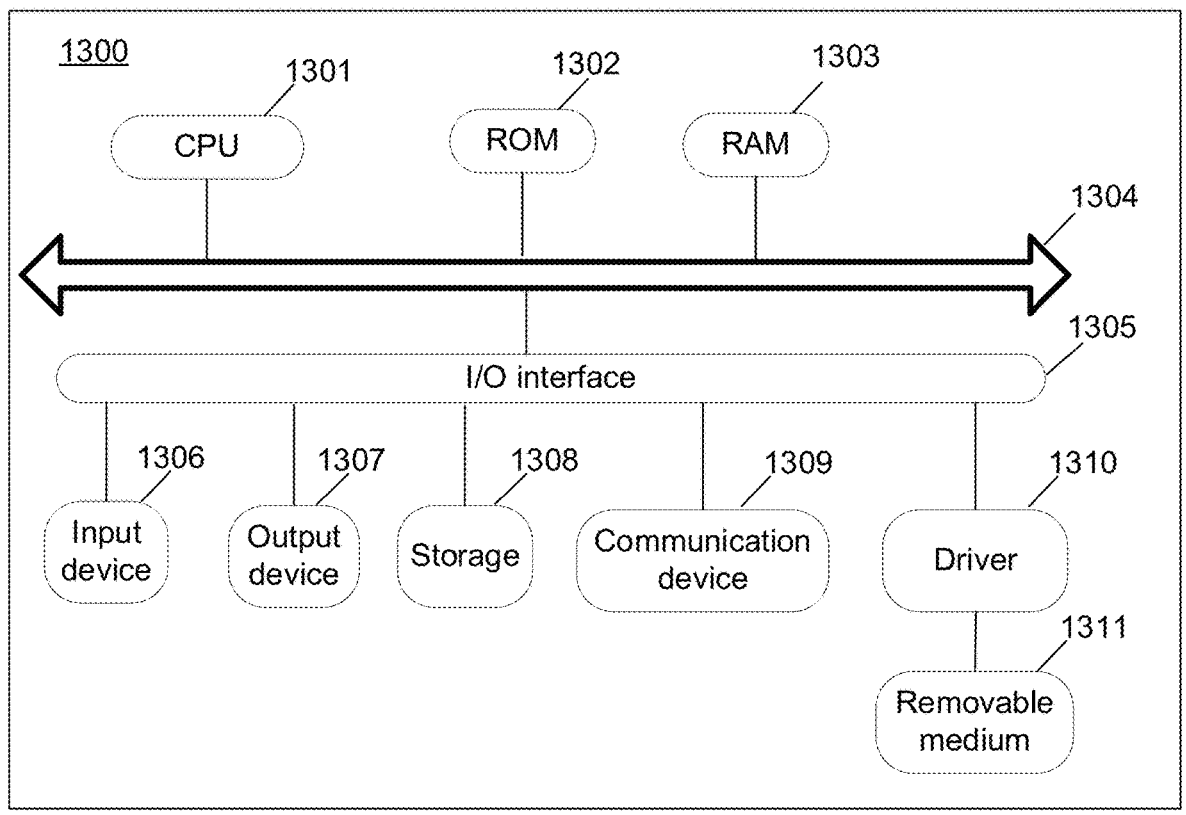
FIG. 13 is a block diagram showing an example structure of a computer system that may be employed in some embodiments of the present disclosure.

In addition, according to some embodiments of the present disclosure, when various operations/processes according to the present disclosure are implemented by software and/or firmware, programs constituting the software can be installed from a storage medium or a network to a computer system having a dedicated hardware structure, such as the computer system 1300 shown in FIG. 13, which can perform various functions including functions such as those described above when various programs are installed.

FIG. 13 is a block diagram showing an example structure of a computer system 1300 that may be employed in some embodiments of the present disclosure. In FIG. 13, a central processing unit (CPU) 1301 executes various processes according to programs stored in a read only memory (ROM) 1302 or programs loaded from a storage 1308 to a random access memory (RAM) 1303. In the RAM 1303, data required when the CPU 1301 executes various processes and the like is also stored as required. The central processing unit is only exemplary, and it can also be other types of processors, such as the various processors described above. ROM 1302, RAM 1303 and storage 1308 may 1308 may be various forms of computer-readable storage media, as described below. It should be noted that although ROM 1302, RAM 1303 and storage 1308 are shown in FIG. 13 respectively, one or more of them may be combined or located in the same or different memories or storage modules.

A CPU 1301, a ROM 1302 and a RAM 1303 are connected to each other via a bus 1304. Input/output interface 1305 is also connected to bus 1304.

The following components are connected to the input/output interface 1305: an input device 1306 such as a touch screen, a touch pad, a keyboard, a mouse, an image sensor, a microphone, an accelerometer, a gyroscope, etc. Output device 1307 including a display such as a cathode ray tube (CRT), a liquid crystal display (LCD), a speaker, a vibrator, etc. A storage 1308, including a hard disk, a magnetic tape, etc. And communication device 1309 including network interface cards such as LAN cards, modems, etc. The communication device 1309 allows communication processing to be performed via a network such as the Internet. It is easy to understand that although each device or module in the computer system 1300 is shown in FIG. 13 to communicate through the bus 1304, they can also communicate through a network or other means, wherein the network can include a wireless network, a wired network, and/or any combination of wireless networks and wired networks.

A driver 1310 is also connected to the input/output interface 1305 as required. A removable medium 1311, such as a magnetic disk, an optical disk, a magneto-optical disk, a semiconductor memory, etc., is installed on the driver 1310 as required, so that a computer program read therefrom is installed in the storage 1308 as required.

In a case where the above series of processes are realized by software, a program constituting the software may be installed from a network such as the Internet or a storage medium such as the removable medium 1311.

According to embodiments of the present disclosure, the process described above with reference to the flowchart may be implemented as a computer software program. For example, embodiments of the present disclosure include a computer program product including a computer program carried on a computer readable medium, the computer program containing program code for executing the method shown in the flowchart. In such embodiments, the computer program can be downloaded and installed from the network through the communication device 1309, or installed from the storage 1308 or from the ROM 1302. When the computer program is executed by the CPU 1301, the above functions defined in the method of the embodiment of the present disclosure are executed.

It should be noted that in the context of the present disclosure, a computer-readable medium may be a tangible medium, which may contain or store a program for use by or in connection with an instruction execution system, apparatus or device. The computer-readable medium can be a computer-readable signal medium or a computer-readable storage medium or any combination of the two. The computer-readable storage medium can be, for example, but not limited to, an electrical, magnetic, optical, electromagnetic, infrared, or semiconductor system, device, or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which can be used by or in connection with an instruction execution system, apparatus or device. In the present disclosure, the computer-readable signal medium may include a data signal propagated in baseband or as a part of a carrier wave, in which the computer-readable program code is carried. This propagated data signal can take various forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained on the computer-readable medium can be transmitted by any suitable medium, including but not limited to electric wires, optical cables, RF (Radio Frequency), etc., or any suitable combination of the above. The computer readable medium may be included in the electronic device; or it may exist alone and not be assembled into the electronic device.

In some embodiments, there is also provided a computer program comprising instructions that, when executed by a processor, cause the processor to perform the method of any of the above embodiments. For example, the instructions may be embodied as computer program code.

In embodiments of the present disclosure, computer program codes for performing the operations of the present disclosure may be written in one or more programming languages or a combination thereof, including but not limited to object-oriented programming languages such as Java, Smalltalk, C++, and conventional procedural programming languages such as "C" language or similar programming languages. The program code can be executed completely on the user computer, partially on the user computer, as an independent software package, partially on the user computer, partially on a remote computer, or completely on a remote computer or server. In a case involving a remote computer, the remote computer may be connected to a user computer through any kind of network (including a local area network (LAN) or a wide area network (WAN)), or may be connected to an external computer (for example, connected through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code containing one or more executable instructions for implementing specified logical functions. It should also be noted that in some alternative implementations, the functions noted in the blocks may also occur in a different order from those noted in the drawings. For example, two blocks represented in succession may actually be executed in substantially parallel, or they may sometimes be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or operations, or can be implemented with combinations of dedicated hardware and computer instructions.

The modules, components or units described in the embodiments of the present disclosure can be implemented by software or hardware. Among them, the name of a module, component or unit does not constitute the definition of the module, component or unit itself under certain circumstances.

The functions described above herein may be performed at least in part by one or more hardware logic components. For example, without limitation, exemplary hardware logic components that can be used include: field programmable gate array (FPGA), application specific integrated circuit (ASIC), application specific standard product (ASSP), system on chip (SOC), complex programmable logic device (CPLD), etc.

The above description is only an explanation of some embodiments of the disclosure and the applied technical principles. It should be understood by those skilled in the art that the disclosure scope involved in the present disclosure is not limited to the technical solutions formed by the specific combination of the above technical features, but also covers other technical solutions formed by any combination of the above technical features or their equivalent features without departing from the above disclosure concept. For example, the technical solutions formed by replacing the above features with the technical features with similar functions disclosed in the present disclosure (but not limited to).

In the description provided herein, many specific details are set forth. However, it is understood that embodiments of the present disclosure may be practiced without these specific details. In other cases, well-known methods, structures and techniques have not been shown in detail in order not to obscure the understanding of this description.

Furthermore, although the operations are depicted in a particular order, this should not be understood as requiring that the operations be performed in the particular order shown or performed in a sequential order. Under certain circumstances, multitasking and parallel processing may be advantageous. Likewise, although several specific implementation details are included in the above discussion, these should not be interpreted as limitations on the scope of the present disclosure. Certain features described in the context of separate embodiments may also be implemented in a single embodiment in combination. On the contrary, various features described in the context of a single embodiment can also be implemented in multiple embodiments individually or in any suitable sub-combination.

Although some specific embodiments of the disclosure have been described in detail by examples, it should be understood by those skilled in the art that the above examples are for illustration only, and are not intended to limit the scope of the disclosure. It should be understood by those skilled in the art that modifications can be made to the above embodiments without departing from the scope and spirit of the present disclosure. The scope of the present disclosure is defined by the appended claims.

What is claimed is:

1. A method for enabling moving comments to a video, comprising:
    obtaining the video from a server;
    providing a moving comment display area for displaying moving comments, a video playing area for displaying the video in a non-full screen mode, and a moving comment post entry control on a screen of an electronic device, wherein the video playing area does not overlap with the moving comment display area, wherein each of the moving comments is associated with a respective playing progress of the video, and moves from one edge of the screen to an opposite edge of the screen in the moving comment display area;
    displaying a moving comment input interface for inputting a moving comment of the moving comments on the screen, in response to a trigger operation on the moving comment post entry control;
    while displaying the video, displaying the inputted moving comment in the moving comment display area at a time corresponding to the respective playing progress of the video associated with the inputted moving comment and displaying the moving comment post entry control concurrently; and
    displaying a full screen entry control and the moving comment post entry control side by side, wherein the full screen entry control comprises a full screen icon and a full screen description, and the moving comment post entry control comprises a moving comment post icon and a moving comment post description, and wherein:
    the full screen entry control is folded with the full screen icon being displayed and the full screen description being hidden; or
    the moving comment post entry control is folded with the moving comment post icon being displayed and the moving comment post description being hidden.

2. The method of claim 1, wherein the video is a landscape video, and the screen of the electronic device is in a portrait screen state.

3. The method of claim 1 further comprising determining whether the video meets a condition, the condition comprising at least one of:
    the video is a landscape video; or
    a time length of the video is larger than or equal to a first time period, wherein the moving comments and the moving comment post entry control are displayed in response to determining the video meets the condition.

4. The method of claim 1, wherein the moving comment post entry control is displayed in response to a pause operation on the video, and the method further comprising:
hiding the moving comment post entry control in response to a play operation on the video.

5. The method of claim 1, wherein the moving comment post entry control is folded in response to a trigger operation on the moving comment post entry control or after the moving comment post entry control is displayed for a second time period.

6. The method of claim 1 further comprising displaying a moving comment prompt message as a moving comment in the moving comment display area, wherein:
the moving comment prompt message is displayed with the moving comments; or
the moving comment prompt message is displayed without the moving comments.

7. The method of claim 6, wherein
the moving comment prompt message is displayed after a user watches the video for a third time period.

8. The method of claim 6 further comprising:
displaying the moving comment input interface on the screen in response to a trigger operation on the moving comment prompt message.

9. The method of claim 1, wherein the inputted moving comment is highlighted while being displayed in the moving comment display area if it is posted by a user at a first time.

10. The method of claim 1 further comprising:
displaying a moving comment off control along with the moving comment input interface on the screen; and
hiding the moving comments and the moving comment post entry control in response to a trigger operation on the moving comment off control.

11. The method of claim 1 further comprising:
hiding the moving comments and the moving comment post entry control if the video is switched to a full screen mode.

12. The method of claim 1 further comprising:
displaying a moving comment interactive interface on the screen, in response to a click operation on a first moving comment of the moving comments in the moving comment display area, wherein the moving comment interactive interface comprises an interactive control on the first moving comment.

13. The method of claim 1 further comprising hiding the moving comments and the moving comment post entry control in response to a long press operation or a double click operation on any of the moving comments.

14. The method of claim 1 further comprising:
displaying a video interactive interface on the screen in response to a long press operation on the video, wherein a moving comment off control is displayed in the video interactive interface if a moving comment function is enabled, and a moving comment on control is displayed in the video interactive interface if the moving comment function is disabled.

15. The method of claim 1 further comprising:
displaying an account privacy setting interface comprising a switch control to enable or disable a moving comment function of videos created by a user on the screen, wherein the moving comment function cannot be enabled via other controls if the switch control is turned off.

16. The method of claim 1 further comprising:
displaying at least one of a video editing interface or a video posting interface for a second video to be posted by a user on the screen, the at least one of the video editing interface or the video posting interface comprising a switch control to enable or disable a moving comment function of the second video.

17. The method of claim 1 further comprising:
displaying a video sharing interface for a third video that has been posted by a user on the screen, the video sharing interface comprising a switch control to enable or disable a moving comment function of the third video.

18. An electronic device, comprising:
a processor; and
a memory with instructions stored thereon which, when executed by the processor, cause the processor to:
obtain a video from a server;
provide a moving comment display area for displaying moving comments, a video playing area for displaying the video in a non-full screen mode, and a moving comment post entry control on a screen of the electronic device, wherein the video playing area does not overlap with the moving comment display area, wherein each of the moving comments is associated with a respective playing progress of the video, and moves from one edge of the screen to an opposite edge of the screen in the moving comment display area;
display a moving comment input interface for inputting a moving comment of the moving comments on the screen, in response to a trigger operation on the moving comment post entry control;
while displaying the video, display the inputted moving comment in the moving comment display area at a time corresponding to the respective playing progress of the video associated with the inputted moving comment and display the moving comment post entry control concurrently; and
display a full screen entry control and the moving comment post entry control side by side, wherein the full screen entry control comprises a full screen icon and a full screen description, and the moving comment post entry control comprises a moving comment post icon and a moving comment post description, and wherein:
the full screen entry control is folded with the full screen icon being displayed and the full screen description being hidden; or
the moving comment post entry control is folded with the moving comment post icon being displayed and the moving comment post description being hidden.

19. A non-transitory computer-readable storage medium having instructions stored thereon which, when executed by a processor, cause the processor to:
obtain a video from a server;
provide a moving comment display area for displaying moving comments, a video playing area for displaying the video in a non-full screen mode, and a moving comment post entry control on a screen of an electronic device, wherein the video playing area does not overlap with the moving comment display area, wherein each of the moving comments is associated with a respective playing progress of the video, and moves from one edge of the screen to an opposite edge of the screen in the moving comment display area;

display a moving comment input interface for inputting a moving comment of the moving comments on the screen, in response to a trigger operation on the moving comment post entry control;

while displaying the video, display the inputted moving comment in the moving comment display area at a time corresponding to the respective playing progress of the video associated with the inputted moving comment and display the moving comment post entry control concurrently; and display a full screen entry control and the moving comment post entry control side by side, wherein the full screen entry control comprises a full screen icon and a full screen description, and the moving comment post entry control comprises a moving comment post icon and a moving comment post description, and wherein:

the full screen entry control is folded with the full screen icon being displayed and the full screen description being hidden; or the moving comment post entry control is folded with the moving comment post icon being displayed and the moving comment post description being hidden.

\* \* \* \* \*